(12) United States Patent
Park et al.

(10) Patent No.: US 8,991,193 B2
(45) Date of Patent: Mar. 31, 2015

(54) COOLING AND HEATING CUP HOLDER

(71) Applicant: Hyundai Motor Company, Seoul (KR)

(72) Inventors: Jae Woo Park, Whasung-Si (KR); Jae Woong Kim, Whasung-Si (KR); Man Ju Oh, Whatsung-Si (KR)

(73) Assignee: Hyundai Motor Company, Seoul (KR)

( * ) Notice: Subject to any disclaimer, the term of this patent is extended or adjusted under 35 U.S.C. 154(b) by 357 days.

(21) Appl. No.: 13/687,549

(22) Filed: Nov. 28, 2012

(65) Prior Publication Data

US 2014/0069112 A1 Mar. 13, 2014

(30) Foreign Application Priority Data

Sep. 13, 2012 (KR) .................... 10-2012-0101436

(51) Int. Cl.
*F25B 21/02* (2006.01)
*B60N 3/10* (2006.01)
*B60H 1/22* (2006.01)

(52) U.S. Cl.
CPC .............. *B60N 3/104* (2013.01); *B60H 1/2225* (2013.01)
USPC .............................................. 62/3.3; 62/3.64

(58) Field of Classification Search
USPC ............. 62/3.2, 3.3, 3.62, 3.64, 457.3, 457.4, 62/457.9; 165/168, 184
See application file for complete search history.

(56) References Cited

U.S. PATENT DOCUMENTS

| | | | | |
|---|---|---|---|---|
| 2,931,188 A * | 4/1960 | Levit | | 62/3.3 |
| 4,488,865 A * | 12/1984 | Davis | | 431/1 |
| 4,711,099 A * | 12/1987 | Polan et al. | | 62/457.4 |
| 5,048,307 A * | 9/1991 | Baxter | | 62/457.4 |
| 5,207,762 A * | 5/1993 | Newman | | 62/419 |
| 5,636,522 A * | 6/1997 | Ramos | | 62/294 |
| 6,035,660 A * | 3/2000 | Craft | | 62/457.9 |
| 6,119,461 A * | 9/2000 | Stevick et al. | | 62/3.64 |
| 7,146,826 B1 * | 12/2006 | Schlosser | | 62/457.9 |
| 2003/0106895 A1 * | 6/2003 | Kalal | | 220/9.2 |

* cited by examiner

Primary Examiner — Melvin Jones
(74) Attorney, Agent, or Firm — Morgan, Lewis & Bockius LLP

(57) ABSTRACT

A cooling and heating cup holder may include a holder body being open in a top thereof and defining a space therein so as to receive a cup, a blower fluid-connected to first and second sides of the holder body, wherein the blower supplies air to the first side of the holder body and draws the air off from the second side of the holder body to circulate the air around the holder body, and a flow guide having a spiral shape provided along an inner circumferential surface of the holder body, wherein a first end of the flow guide may be fluid-connected to the first side of the holder body and a second end of the flow guide may be fluid-connected to the second side of the holder body so that the flow guide guides the air in the holder body to flow spirally outside an outer circumferential surface of the cup held in the holder body.

16 Claims, 3 Drawing Sheets

COOLING AND HEATING CUP HOLDER

CROSS-REFERENCE TO RELATED APPLICATION

The present application claims priority to Korean Patent Application No. 10-2012-0101436, filed on Sep. 13, 2012, the entire contents of which is incorporated herein for all purposes by this reference.

BACKGROUND OF THE INVENTION

1. Field of the Invention

The present invention relates to a cooling and heating cup holder which is installed in a vehicle, etc., holds a cup therein and cools or heats the contents of the cup.

2. Description of Related Art

A vehicle, etc. is provided with a cup holder. Although most conventional cup holders that are installed in vehicles have a simple function of holding cups, cup holders that are proposed to be installed in some vehicle models have a cooling and heating function in addition to the cup holding function.

However, the conventional cup holders having the cooling and heating function are problematic in that the cup holders are configured to realize the cooling and heating function by heat conduction, however, it is almost impossible to efficiently cool or heat the contents only by heat conduction.

FIG. 1 illustrates a conventional cooling and heating cup holder. As shown in the drawing, although the conventional cooling and heating cup holder uses a Peltier element 20, this cup holder is configured in such a way that a cup held in the cup holder can be cooled or heated by heat that is transferred to a cup holder body 10 only by heat conduction.

Therefore, the above-mentioned technique is problematic in that, when the contact surface area between the cup and the cup holder is small, heat conduction may not realize a desired cooling and heating function. Described in detail, the size of the cup may not correspond to the size of the cup holder and the cup may have a recessed bottom. Further, when the cup is a paper cup, the material of which has low heat conductivity, heat conduction may fail to transfer heat to the cup so that the temperature of the cup tends to become equal to an environmental temperature.

Accordingly, it is required to propose a cup holder that can solve the problems and can efficiently realize the cooling and heating function.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a cooling and heating cup holder which uses an air controlling technique that can surmount the problems experienced in the conventional cup holder using heat transfer only by heat conduction so that the present invention can efficiently realize the cooling and heating function of the cup holder.

In an aspect of the present invention, a cooling and heating cup holder may include a holder body being open in a top thereof and defining a space therein so as to receive a cup, a blower fluid-connected to first and second sides of the holder body, wherein the blower supplies air to the first side of the holder body and draws the air off from the second side of the holder body to circulate the air around the holder body, and a flow guide having a spiral shape provided along an inner circumferential surface of the holder body, wherein a first end of the flow guide is fluid-connected to the first side of the holder body and a second end of the flow guide is fluid-connected to the second side of the holder body so that the flow guide guides the air in the holder body to flow spirally outside an outer circumferential surface of the cup held in the holder body.

The holder body is made of a heat conductive material.

The cooling and heating cup holder may include a Peltier element that is mounted to a sidewall of the holder body so as to cool or heat the holder body.

The cooling and heating cup holder may further include a Peltier element that is mounted to a bottom side of the holder body so as to cool or heat the holder body.

The cooling and heating cup holder may further include a Peltier element that is provided in an air flow passage formed by both the blower and a tube that fluid-connects the blower to first and second sides of the holder body.

The blower is fluid-connected to the first and second sides of the holder body by a tube.

The first side of the holder body, to which the tube is connected, is placed in an upper part of the holder body, and the second side of the holder body, to which the tube is connected, is placed in a lower part of the holder body so that air circulates in a direction from the upper part to the lower part of the holder body.

The tube may include an exhaust tube that is connected to the first side of the holder body, and a suction tube that is connected to the second side of the holder body, wherein a blower fan is mounted between the exhaust tube and the suction tube and circulates the air therebetween.

The flow guide is formed in a shape of a spiral channel that is defined in a sidewall of the holder body by recessing the sidewall outwards.

The flow guide is formed in a shape of a channel that is integrally formed with the holder body as a single structure.

The flow guide may include a spiral strap that is inserted into the holder body so that the spiral strap comes into contact with the inner circumferential surface of the holder body.

The spiral strap may have elasticity to elastically support the cut such that the flow guide comes into contact with the outer circumferential surface of the cup.

The holder body is produced in such a way that a sidewall which surrounds the cup and a bottom which closes a lower end of the holder body are separately produced and are assembled with each other into a single body.

The flow guide may have a diameter that gradually increases in a direction from the first end to the second end thereof.

The first end of the flow guide is disposed in an upper part of the holder body and the second end of the flow guide is disposed in a lower part of the holder body.

An outer circumferential surface of the holder body is covered with an insulation material.

The cooling and heating cup holder having the above-mentioned construction can perform heat transfer by conduction and convection so that the cup holder can efficiently realize the cooling and heating function.

Further, the cup holder can cool or heat a cup in a state in which the cup holder surrounds the cup by a spiral flow guide, so that the cup holder does not require provision of an additional structure for intercepting air in the mouth or another part of the cup holder.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
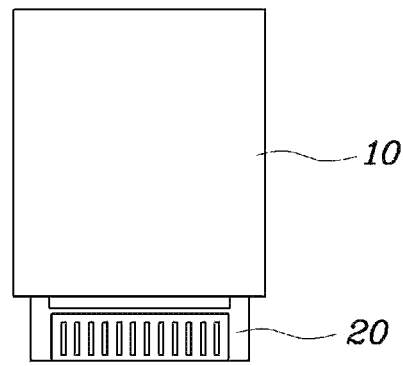
FIG. 1 is a view illustrating a conventional cooling and heating cup holder.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinbelow, cooling and heating cup holders according to preferred embodiments of the present invention will be described with reference to the accompanying drawings.

Figure 2:
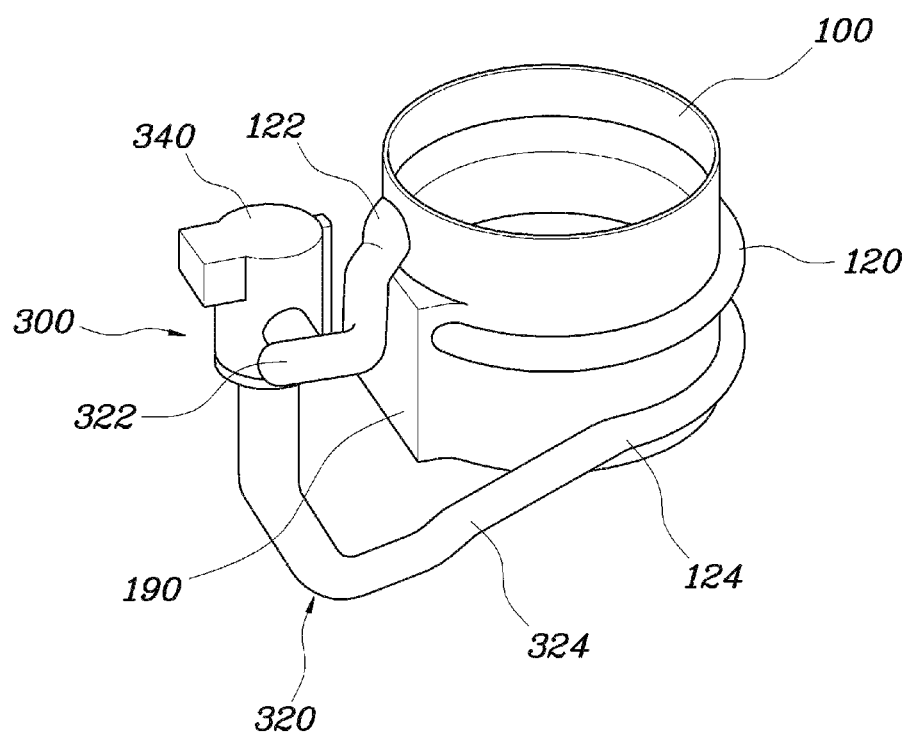
FIG. 2 is a view illustrating a cooling and heating cup holder according to an exemplary embodiment of the present invention.

FIG. 2 is a view illustrating a cooling and heating cup holder according to an exemplary embodiment of the present invention. As shown in the drawing, the cooling and heating cup holder of the present invention includes: a holder body 100 being open in the top thereof and defining a space therein so as to receive a cup C, a blower 300 connected to first and second sides of the holder body 100 using a tube 320 so that the blower can supply air to the first side of the holder body and can draw air off from the second side of the holder body, thereby circulating air in the holder body 100, and a flow guide having a spiral shape provided along the inner circumferential surface of the holder body 100, a first end of the flow guide being connected to the first side of the holder body 100 and a second end of the flow guide being connected to the second side of the holder body 100 so that the flow guide guides air in the holder body 100 in such a way that the air can flow spirally outside the outer circumferential surface of the cup C held in the holder body.

The cup holder of the present invention has the holder body 100 that can hold a cup therein. Here, the holder body 100 has a shape, the top of which is open so as to receive the cup C in the holder body. Therefore, when a variety of cups are received in the holder body 100, a space remains between the cup C and the holder body 100.

In the holder body 100, respective connection ports 122 and 124 are provided in the first and second sides. Tubes 322 and 324 are connected to the respective connection ports 122 and 124. The tubes 322 and 324 are connected to the blower 300. The blower 300 supplies air to the first side of the holder body 100 and draws air off from the second side of the holder body through the two respective tubes 322 and 324. Therefore, air can circulate in the holder body 100 and can cool or heat the cup through heat transfer by convection.

Further, in the holder body 100, the flow guide having a spiral shape is provided along the inner circumferential surface of the holder body 100. Here, the first end of the flow guide is connected to the first side of the holder body 100 and the second end of the flow guide is connected to the second side of the holder body 100 so that the flow guide can guide air in the holder body 100 in such a way that the air can flow spirally outside the outer circumferential surface of the cup C held in the holder body.

When the flow guide guides air blown from the blower so that the air can flow spirally along the outer circumferential surface of the cup, as described above, the flow guide can prevent the air from flowing out to the outside through the top of the holder body 100 and can increase the air contact surface area of the cup C so that heat transfer by convection can be performed for a sufficiently lengthy period of time, thereby realizing improved thermal efficiency.

In other words, unlike a technique in which air simply and quickly flows outside the cup C, the present invention can increase the air contact time in which the cup C is in contact with air so as to be cooled or heated, by making the air flow spirally around the cup C. Therefore, due to the increased air contact time, the present invention can quickly cool or heat the cup and can allow the air to efficiently flow around the cup without resistance by forming such a spiral flow passage.

Further, when the holder body 100 is made of a heat conductive material, a heat conduction effect may be added to the cooling and heating function of the holder body. Described in detail, when the holder body 100 further includes a Peltier element 500 that can cool or heat the holder body 100, the Peltier element 500 can directly cool or heat the holder body 100. Further, in the above state, air circulates along the inner circumferential surface of the holder body 100 having the Peltier element so that heat transfer by conduction and convection is realized between the cup C and the holder body 100, thereby quickly cooling or heating the cup C.

Here, the Peltier element 500 may be provided in an air flow passage that is formed by both the blower 300 and the tube 320 so that the cup can be cooled or heated by convection using the circulating air and, at the same time, the holder body can be cooled or heated by convection, and the cup can be further cooled or heated by conduction by the cooled or heated holder body 100.

Here, in an exemplary embodiment of the present invention, the first side of the holder body 100, to which the tube 320 is connected, is placed in the upper part of the holder body 100, and the second side of the holder body 100, to which the tube 320 is also connected, is placed in the lower part of the holder body 100 so that air can circulate in a direction from the upper part to the lower part of the holder body 100. This configuration is based on the factor that the cooling and heating function of the cup holder is mainly used in the summer season and air naturally flows such that cold air flows downward and hot air flows upward.

Further, the blower 300 includes an exhaust tube 322 that is connected to the first side of the holder body 100, a suction tube 324 that is connected to the second side of the holder body 100, and a blower fan 340 that circulates air between the exhaust tube 322 and the suction tube 324 so that the elements of the blower 300 can form a closed flow passage which is free from air loss. Therefore, although there may be some air loss generated from the holder body 100, most air circulating in the cup holder can be recycled without loss due to the closed flow passage, thereby realizing improved thermal efficiency.

Further, the flow guide may be formed in the shape of a spiral channel 120 that is defined in the sidewall of the holder body 100 by recessing the sidewall outwards. Described in detail, the flow guide may be formed in the shape of the channel 120 that is integrally formed with the holder body 100 as a single structure, as shown in the accompanying drawings. Here, the holder body 100 is a heat conductive body so that the flow guide can be formed by the channel 120 that is integrally formed in the heat conductive holder body 100. In this case, even when the cup held in the holder body is frequently replaced with other cups, the flow guide can be prevented from deformation. Further, a simple process of producing the cup holder is realized, thereby reducing production cost.

Figure 5:
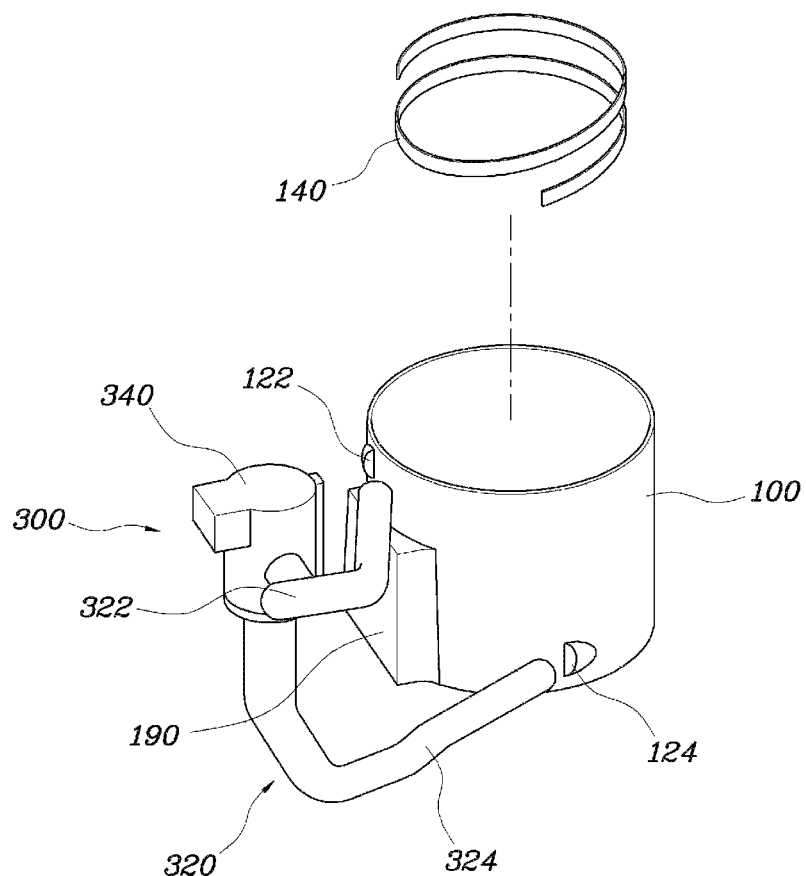
FIG. 5 is a view illustrating a cooling and heating cup holder according to a further embodiment of the present invention.

FIG. 5 illustrates a cooling and heating cup holder according another embodiment of the present invention. As shown in the drawing, the flow guide according to the present exemplary embodiment is formed by a spiral strap 140 that is inserted into the holder body 100 so that the spiral strap 140 comes into contact with the inner circumferential surface of the holder body 100 and is, accordingly, held in the holder body 100. Here, the strap 140 may have elasticity so that it can come into close contact with the inner circumferential surface of the holder body 100. In this case, the elastic spiral strap is advantageous in that the strap can be used with a variety of holder bodies 100 having different sizes and the shape of the flow guide can be somewhat freely designed.

Further, the holder body 100 may be produced in such a way that the sidewall which surrounds the cup C and the bottom which closes the lower end of the holder body are separately produced and are assembled with each other into a single body. This process is based on the factor that, when the holder body 100 is made of a heat conductive material such as a metal, it is difficult to integrally form the sidewall and the bottom of the cup holder. To overcome the difficulty in the production process, the sidewall and the bottom of the cup holder are separately produced and are assembled with each other into a single body using an assembling technique such as forcible fitting. Particularly, when the holder body is produced using aluminum through hydroforming that may limit the shape of a product, the above-mentioned process in which the sidewall and the bottom of the cup holder are separately produced and are assembled with each other into a single body can solve the problem of limiting the shape of the product.

Further, in an exemplary embodiment of the present invention, the diameter of the flow guide may gradually increase in a direction from the upper part to the lower part of the holder body 100 so that the flow rate of air is reduced in the lower part of the holder body 100, thereby efficiently cooling or heating the cup in the lower part. Further, the outer circumferential surface of the holder body 100 may be covered with an insulation material so as to improve thermal efficiency and restrict freezing, etc.

Figure 3:
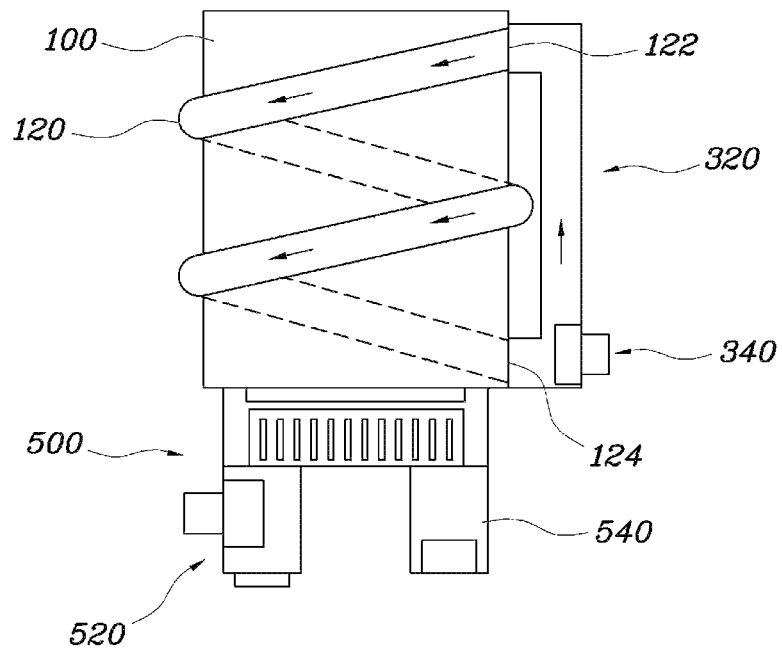
FIG. 3 is a view illustrating a cooling and heating cup holder according to another embodiment of the present invention.

FIG. 3 illustrates a cooling and heating cup holder according to a further embodiment of the present invention. In this embodiment, the Peltier element is mounted to the bottom of the holder body, unlike the exemplary embodiment of FIG. 2 in which the Peltier element is mounted on the sidewall 190 of the holder body. In this embodiment, heat dissipating fins may be provided around the Peltier element, and both a blower 520 and a flow channel 540 may be provided so as to cooperate with the heat dissipating fins.

Figure 4:
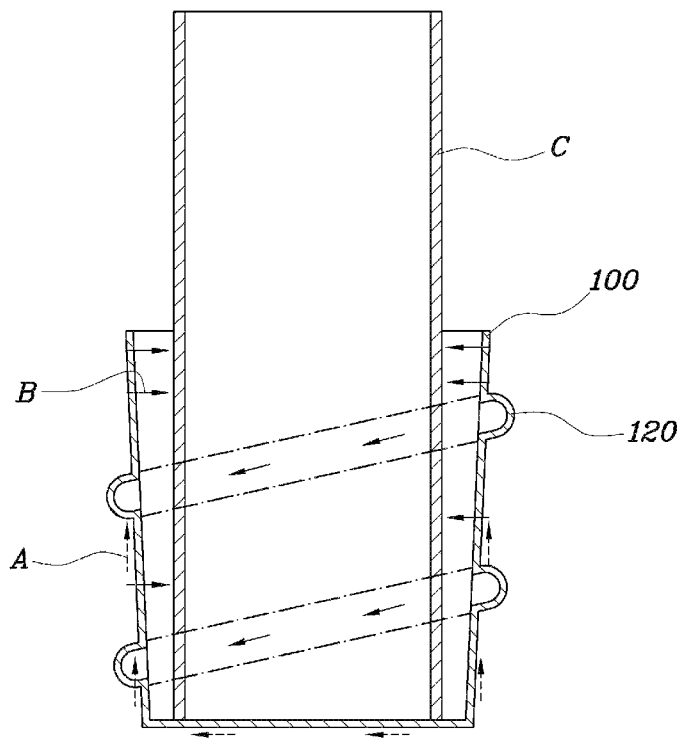
FIG. 4 is a view illustrating a heat transfer path in the cooling and heating cup holder of the present invention.

FIG. 4 is a view illustrating a heat transfer path in the cooling and heating cup holder of the present invention. As shown in the drawing, the cooling and heating cup holder of the present invention more efficiently performs the cooling and heating function by direct heat transfer from the cup holder 100 by conduction A, by indirect heat transfer from air by convection B, and by direct heat transfer from the holder body 100 by convection B.

Figure 6:
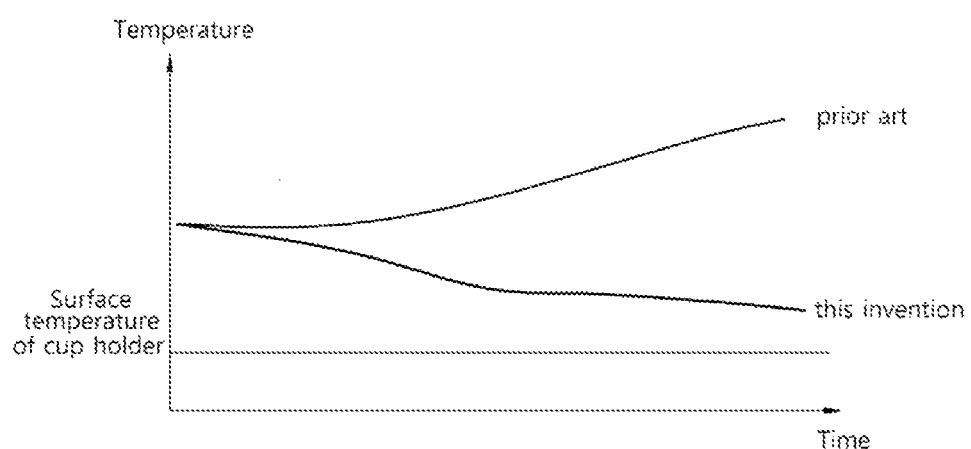
FIG. 6 is a graph illustrating the difference of a cooling and heating function between the conventional cup holder and the cup holder of the present invention.

FIG. 6 is a graph illustrating the difference of a cooling and heating function between a conventional cup holder and the cup holder of the present invention. As illustrated in the graph, the cooling and heating cup holder of the present invention can remarkably reduce the temperature of a cup in a cooling mode compared to the conventional cooling and heating cup holder so that the temperature of the cup held in the cup holder of the present invention can efficiently approach the surface temperature of the holder body.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A cooling and heating cup holder, comprising:
   a holder body being open in a top thereof and defining a space therein so as to receive a cup;
   a blower fluid-connected to first and second sides of the holder body, wherein the blower supplies air to the first side of the holder body and draws the air off from the second side of the holder body to circulate the air around the holder body; and
   a flow guide having a spiral shape provided along an inner circumferential surface of the holder body,
   wherein a first end of the flow guide is fluid-connected to the first side of the holder body and a second end of the flow guide is fluid-connected to the second side of the holder body so that the flow guide guides the air in the holder body to flow spirally outside an outer circumferential surface of the cup held in the holder body.

2. The cooling and heating cup holder as set forth in claim 1, wherein the holder body is made of a heat conductive material.

3. The cooling and heating cup holder as set forth in claim 1, further including a Peltier element that is mounted to a sidewall of the holder body so as to cool or heat the holder body.

4. The cooling and heating cup holder as set forth in claim 1, further including a Peltier element that is mounted to a bottom side of the holder body so as to cool or heat the holder body.

5. The cooling and heating cup holder as set forth in claim 1, further including a Peltier element that is provided in an air flow passage formed by both the blower and a tube that fluid-connects the blower to first and second sides of the holder body.

6. The cooling and heating cup holder as set forth in claim 1, wherein the blower is fluid-connected to the first and second sides of the holder body by a tube.

7. The cooling and heating cup holder as set forth in claim 6, wherein the first side of the holder body, to which the tube is connected, is placed in an upper part of the holder body, and the second side of the holder body, to which the tube is connected, is placed in a lower part of the holder body so that air circulates in a direction from the upper part to the lower part of the holder body.

8. The cooling and heating cup holder as set forth in claim 6, wherein the tube includes:
an exhaust tube that is connected to the first side of the holder body, and
a suction tube that is connected to the second side of the holder body,
wherein a blower fan is mounted between the exhaust tube and the suction tube and circulates the air therebetween.

9. The cooling and heating cup holder as set forth in claim 1, wherein the flow guide is formed in a shape of a spiral channel that is defined in a sidewall of the holder body by recessing the sidewall outwards.

10. The cooling and heating cup holder as set forth in claim 1, wherein the flow guide is formed in a shape of a channel that is integrally formed with the holder body as a single structure.

11. The cooling and heating cup holder as set forth in claim 1, wherein the flow guide includes a spiral strap that is inserted into the holder body so that the spiral strap comes into contact with the inner circumferential surface of the holder body.

12. The cooling and heating cup holder as set forth in claim 11, wherein the spiral strap has elasticity to elastically support the cut such that the flow guide comes into contact with the outer circumferential surface of the cup.

13. The cooling and heating cup holder as set forth in claim 1, wherein the holder body is produced in such a way that a sidewall which surrounds the cup and a bottom which closes a lower end of the holder body are separately produced and are assembled with each other into a single body.

14. The cooling and heating cup holder as set forth in claim 1, wherein the flow guide has a diameter that gradually increases in a direction from the first end to the second end thereof.

15. The cooling and heating cup holder as set forth in claim 14, wherein the first end of the flow guide is disposed in an upper part of the holder body and the second end of the flow guide is disposed in a lower part of the holder body.

16. The cooling and heating cup holder as set forth in claim 1, wherein an outer circumferential surface of the holder body is covered with an insulation material.

\* \* \* \* \*